(12) United States Patent
Tokuda

(10) Patent No.: US 10,864,725 B2
(45) Date of Patent: Dec. 15, 2020

(54) ELEMENT SUBSTRATE, PRINTHEAD AND PRINTING APPARATUS

(71) Applicant: CANON KABUSHIKI KAISHA, Tokyo (JP)

(72) Inventor: Takamitsu Tokuda, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/668,288

(22) Filed: Oct. 30, 2019

(65) Prior Publication Data

US 2020/0139706 A1 May 7, 2020

(30) Foreign Application Priority Data

Nov. 1, 2018 (JP) ................................. 2018-206874

(51) Int. Cl.
*B41J 2/14* (2006.01)
*B41J 2/045* (2006.01)
*G01K 7/01* (2006.01)

(52) U.S. Cl.
CPC ......... *B41J 2/14088* (2013.01); *B41J 2/0458* (2013.01); *B41J 2/04563* (2013.01); *B41J 2/14072* (2013.01); *B41J 2/14153* (2013.01); *G01K 7/01* (2013.01)

(58) Field of Classification Search
CPC .. B41J 2/04541; B41J 2/04563; B41J 2/0458; B41J 2/14072; B41J 2/14088; B41J 2/14153; B41J 2202/13; G01K 7/01
See application file for complete search history.

(56) References Cited

U.S. PATENT DOCUMENTS

| | | | | |
|---|---|---|---|---|
| 6,290,334 B1 * | 9/2001 | Ishinaga | ............... | B41J 2/04541 347/12 |
| 7,559,626 B2 * | 7/2009 | Sakurai | ................ | B41J 2/04541 347/10 |
| 7,775,620 B2 * | 8/2010 | Furukawa | ............ | B41J 2/04543 347/20 |
| 8,400,484 B2 * | 3/2013 | Furukawa | .................. | B41J 2/07 347/211 |
| 10,406,808 B2 | 9/2019 | Kasai et al. | ......... | B41J 2/04563 |
| 2002/0018092 A1 * | 2/2002 | Inui | ...................... | B41J 2/16579 347/23 |
| 2011/0012960 A1 * | 1/2011 | Sakuma | ............... | B41J 2/14129 347/44 |
| 2019/0381790 A1 | 12/2019 | Kasai et al. | ......... | B41J 2/04563 |

FOREIGN PATENT DOCUMENTS

JP    2012-11759 A    1/2012

* cited by examiner

*Primary Examiner* — Anh T Vo
(74) *Attorney, Agent, or Firm* — Venable LLP

(57) ABSTRACT

An element substrate including heaters, drivers for each heater, and a diode, and connected to an external apparatus having a circuit for detecting a temperature based on a detection signal from the diode, comprises: a first wiring grounded, connected to one end of the diode, and serving as a reference voltage of the detection signal; a second wiring connected to the first wiring near the diode; a first pad connected to the first wiring; and a second pad connected to the second wiring. When the substrate is connected to the apparatus, a wiring serving as a reference voltage for a side where the detection signal of the circuit of the apparatus is inputted is connected to the second pad via the first pad connected to a ground serving as a reference voltage of the apparatus.

10 Claims, 7 Drawing Sheets

ELEMENT SUBSTRATE, PRINTHEAD AND PRINTING APPARATUS

BACKGROUND OF THE INVENTION

Field of the Invention

The present invention relates to an element substrate, a printhead, and a printing apparatus and particularly to, for example, an element substrate in which a temperature detection element is integrated, a printhead incorporating this, and a printing apparatus which performs printing using the printhead in accordance with an inkjet method.

Description of the Related Art

Conventionally, it has been known that in a printhead equipped with a temperature detection element, an error arises in detecting voltage of a temperature detection element, i.e., in the detected temperature due to wiring resistance of circuits. It is considered that a cause of the error in detecting temperature by the wiring resistance is not only the current for driving the temperature detection elements, but also is the effect of a return current when the operating current during the driving of the printhead flows through a ground wiring. For this reason, conventionally, as a configuration for reducing this error, Japanese Patent Laid-Open No. 2012-011759, for example, proposes a configuration in which an end-to-end voltage of a temperature detection element is obtained by using a differential amplifier.

In such a configuration, since the differential amplifier connects a resistor to an input side, the input impedance of the circuit depends on the input resistance. When the input resistance is low, voltage is divided by the input resistance and the wiring resistance in a case where the wiring resistance of the circuit of the temperature detection element is high (for example, several kΩ) and an error arises in the detected temperature. For this reason, an instrumentation amplifier is generally used as an amplifier for increasing the input impedance of the differential amplifier.

However, a differential amplifier can be configured by a single operational amplifier, whereas an instrumentation amplifier requires three operational amplifiers. Therefore, not only does the circuit become complicated, but also the area occupied on the printed circuit board increases, so that the size of the device is inevitably increased.

In addition, although an instrumentation amplifier in which three operational amplifiers and a peripheral circuit are implemented into one package are also commercially available, there is the problem in that there has been difficulty in applying them to actual printheads and printing apparatuses because there is less flexibility in design for a gain bandwidth and the like.

SUMMARY OF THE INVENTION

Accordingly, the present invention is conceived as a response to the above-described disadvantages of the conventional art.

For example, an element substrate, a printhead incorporating the substrate, and a printing apparatus that uses the printhead, according to this invention do not require a complex configuration, and are capable of performing temperature detection with high accuracy.

According to one aspect of the present invention, there is provided an element substrate provided with a plurality of electrothermal transducers, a plurality of drive elements for driving each of the plurality of electrothermal transducers, a logic circuit for supplying a signal to the plurality of drive elements, and a temperature detection element, and connected to an external apparatus having a circuit for detecting a temperature based on a temperature detection signal outputted from the temperature detection element, comprising: a first wiring grounded, connected to an end portion of the temperature detection element, and serving as a reference voltage of the temperature detection signal outputted from the temperature detection element; a second wiring connected to the first wiring in the vicinity of the temperature detection element; a first pad connected to the first wiring; and a second pad connected to the second wiring, wherein in a case where the element substrate is connected to the external apparatus, a wiring serving as a reference voltage for a side on which the temperature detection signal of the circuit that the external apparatus has is inputted is connected to the second pad via the first pad connected to a ground serving as a reference voltage of the external apparatus.

According to another aspect of the present invention, there is provided a printhead that has an element substrate of the above configuration and a plurality of nozzles corresponding to the plurality of electrothermal transducers, and that performs printing by bubbling ink by thermal energy generated by driving the plurality of the electrothermal transducers and discharging ink from the plurality of nozzles.

According to still another aspect of the present invention, there is provided, a printing apparatus for printing by discharging ink to a print medium using the printhead of the above configuration includes an amplifier for amplifying a temperature detection signal outputted from the temperature detection element, an A/D converter for analog-to-digital conversion of the temperature detection signal amplified by the amplifier, a third wiring serving as a reference voltage of an analog part of the amplifier and the A/D converter, a grounded fourth wiring, a fifth pad for connecting the third wiring, and a sixth pad for connecting the fourth wiring, wherein in a case where the printhead is connected, the fifth pad is connected to the second pad, the sixth pad is connected to the first pad, and a circuit is formed from the third wiring through the fifth pad and the second pad, through the second wiring and the first wiring, through the first pad and the sixth pad, and to the fourth wiring.

The invention is particularly advantageous since it is possible to perform temperature detection in which an error is small without using a circuit of a complicated configuration.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings.

In this specification, the term "print" (to be also referred to as a "printing" hereinafter) not only includes the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "print element (or nozzle)" generically means an ink orifice or a liquid channel communicating with it, and an element for generating energy used to discharge ink, unless otherwise specified.

An element substrate for a printhead (head substrate) used below means not merely a base made of a silicon semiconductor, but an arrangement in which elements, wirings, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

<Description of Printing Apparatus (FIGS. 1 to 2)>

Figure 1:
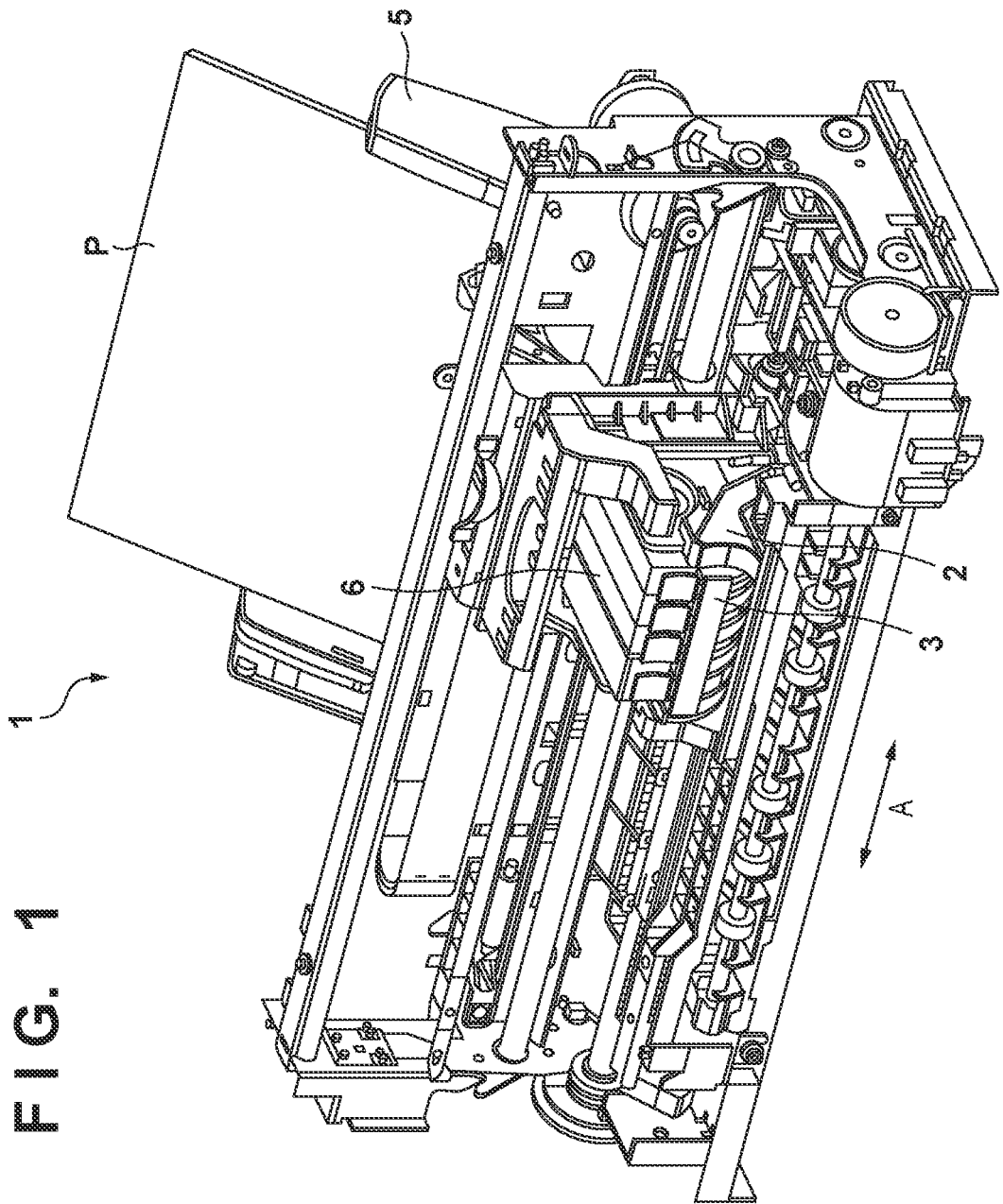
FIG. 1 is a perspective view illustrating a schematic configuration of a printing apparatus equipped with a printhead according to an exemplary embodiment of the present invention.

FIG. 1 is an outside perspective view showing the schematic arrangement of an inkjet printing apparatus that performs printing using an inkjet printhead according to an exemplary embodiment of the present invention.

As shown in FIG. 1, the inkjet printing apparatus (to be referred to as a printing apparatus hereinafter) mounts, on a carriage 2, an inkjet printhead (to be referred to as a printhead hereinafter) 3 that performs printing by discharging ink in accordance with an inkjet method, and reciprocally moves the carriage 2 in the direction of an arrow A, thereby performing printing. A print medium P such as print paper is fed via a feed mechanism 5 and conveyed up to a print position. At the print position, the printhead 3 discharges ink to the print medium P, thereby performing printing.

Not only the printhead 3 is mounted on the carriage 2 of the printing apparatus 1. An ink cartridge 6 that stores ink to be supplied to the printhead 3 is also attached to the carriage 2. The ink cartridge 6 is detachable from the carriage 2.

The printing apparatus 1 shown in FIG. 1 can perform color printing. For this purpose, four ink cartridges that store magenta (M), cyan (C), yellow (Y), and black (K) inks, respectively, are mounted on the carriage 2. The four ink cartridges can independently be detached.

The printhead 3 of this embodiment employs an inkjet method in which ink is discharged by using thermal energy. For this purpose, an electrothermal transducer (heater) is provided. The electrothermal transducer is provided corresponding to each of the orifices, and the ink is discharged from the corresponding orifice by applying pulse voltages to the corresponding electrothermal transducer in accordance with the print signals. The printing apparatus is not limited to a so-called serial type printing apparatus described above, and can also be applied to a so-called full-line type printing apparatus in which printheads (line heads) in which orifices are arranged in the widthwise direction of the print medium are arranged in the conveyance direction of the print medium.

Figure 2:
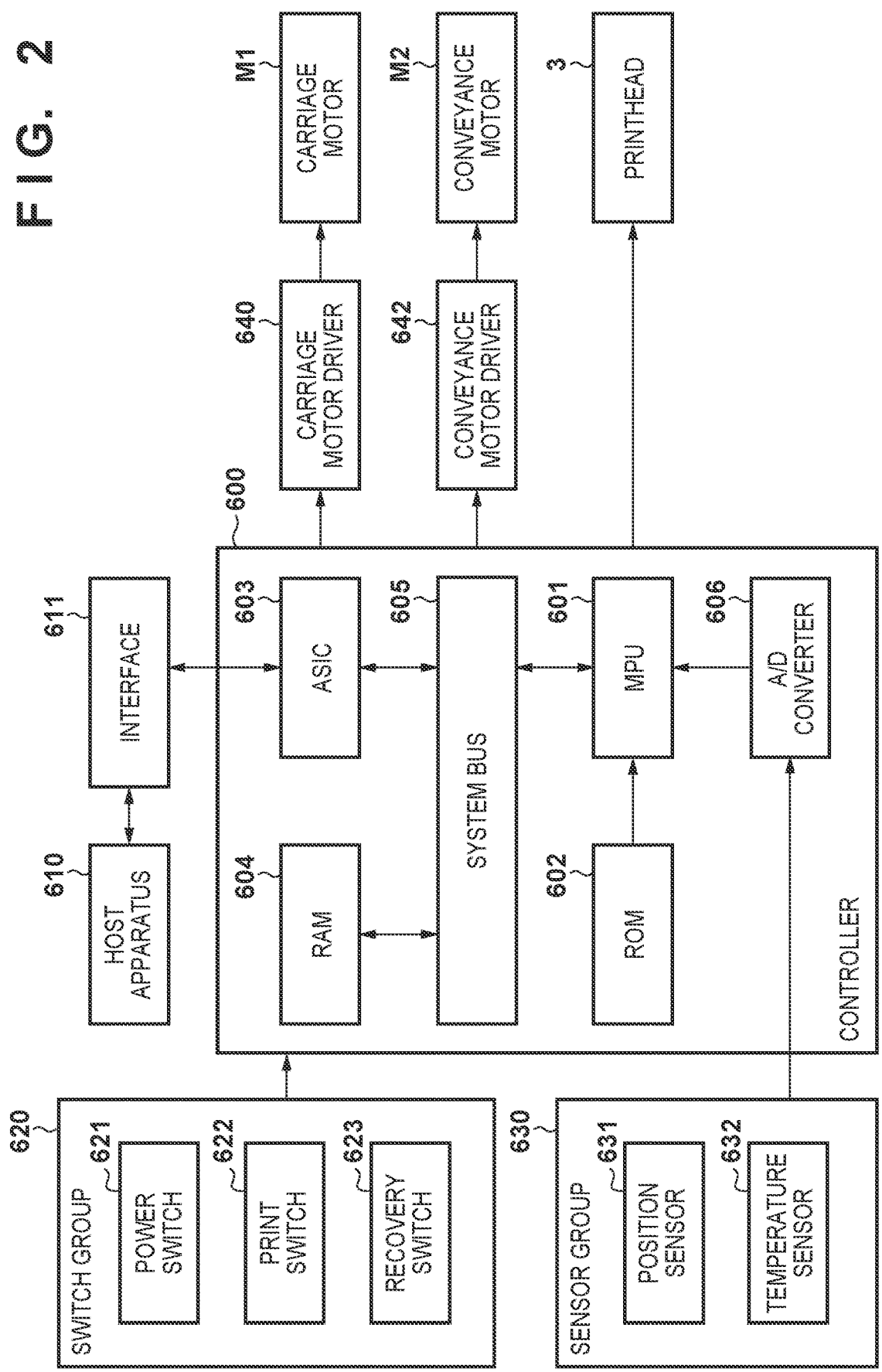
FIG. 2 is a block diagram illustrating a control configuration of the printing apparatus illustrated in FIG. 1.

FIG. 2 is a block diagram showing the control configuration of the printing apparatus shown in FIG. 1.

As shown in FIG. 2, a controller 600 is formed from an MPU 601, a ROM 602, an application specific integrated circuit (ASIC) 603, a RAM 604, a system bus 605, an A/D converter 606, and the like. Here, the ROM 602 stores a program corresponding to a control sequence to be described later, a required table, and other permanent data. The ASIC 603 generates control signals for control of a carriage motor M1, control of a conveyance motor M2, and control of the printhead 3. The RAM 604 is used as a rasterization area for image data, a work area for program execution, and the like. The system bus 605 connects the MPU 601, the ASIC 603, and the RAM 604 to each other and exchanges data. The A/D converter 606 receives an analog signal from a sensor group to be described below, A/D-converts the signal, and supplies a digital signal to the MPU 601.

Also, referring to FIG. 2, reference numeral 610 denotes a computer (or a reader for image reading or a digital camera) that is an image data supply source and is generally called a host apparatus. The host apparatus 610 and the printing apparatus 1 transmit/receive image data, commands, status signals, and the like via an interface (I/F) 611 by using packet communication. As the interface 111, a USB interface may be provided in addition to a network interface, and the USB interface may receive bit data or raster data which is serially transferred from the host apparatus.

In addition, reference numeral 620 denotes a switch group including a power switch 621, print switch 622, a recovery switch 623, and the like.

Reference numeral 630 denotes a sensor group configured to detect an apparatus state, which includes a position sensor 631, a temperature sensor 632, and the like.

Furthermore, reference numeral 640 denotes a carriage motor driver that drives the carriage motor M1 configured to make the carriage 2 reciprocally scan in the direction of the arrow A; and 642, a conveyance motor driver that drives the conveyance motor M2 configured to convey the print medium P.

At the time of print scan by the printhead 3, the ASIC 603 transfers data used to drive a print element (heater for ink discharge) to the printhead while directly accessing the storage area of the RAM 604. In addition, a display unit comprised of an LCD and/or LED as a user interface is provided in the printing apparatus.

Next, an embodiment of a printhead mounted in a printing apparatus having the above-described configuration will be described.

<Description of the Printhead (FIGS. 3 to 4)>

Figure 3:
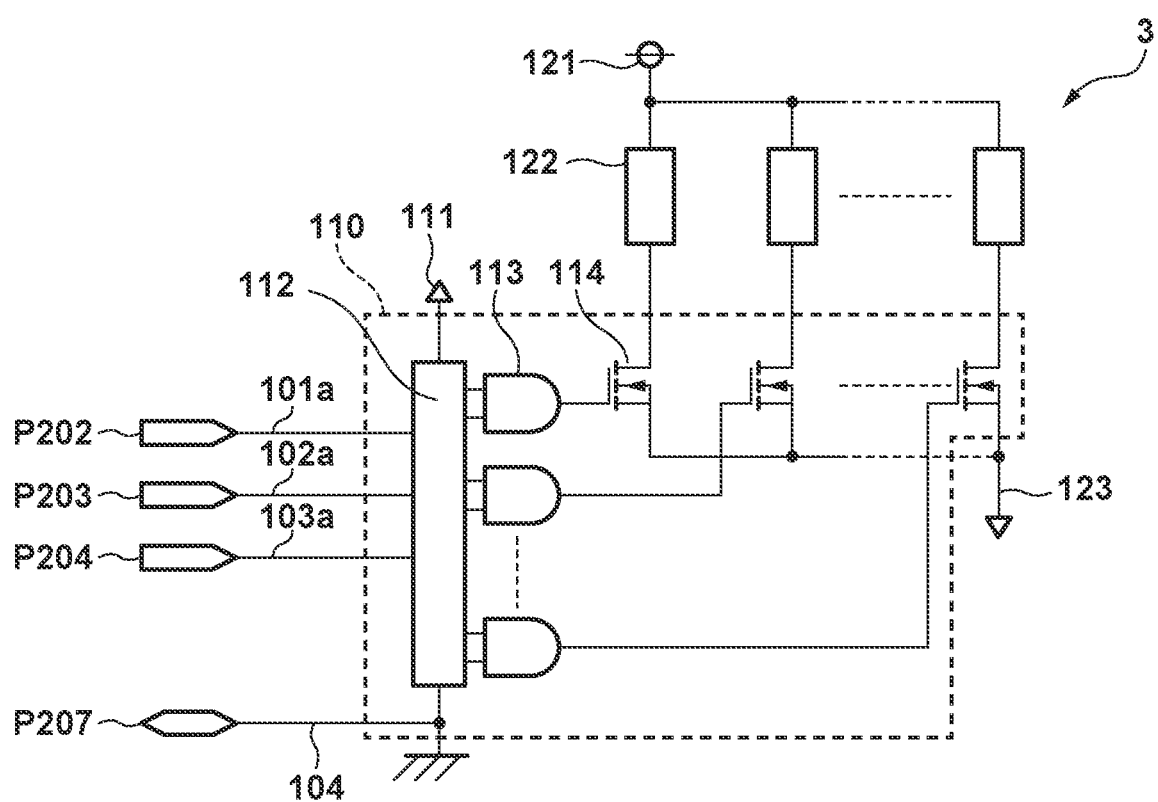
FIG. 3 is a view illustrating a schematic configuration of electric circuits of the printhead.

FIG. 3 is a view illustrating a schematic configuration of an electric circuit of the printhead.

The printhead 3 performs printing by, for example, heating and bubbling a liquid such as an ink by an electrothermal transducer (heater) 122, and discharging the liquid from a nozzle onto a print medium. The circuit is configured such that power to the heater 122 is supplied from a heater power supply 121 of a high-voltage (e.g., 24 V), and current flows to a ground wiring 123 serving as a reference voltage of the heater 122. Normally, a plurality of heaters 122 are arranged on the printhead, and printing is performed by the heaters being driven sequentially or concurrently. Drive control is performed by drive control signals (a clock signal CLK, a data signal DATA, and an enable signal ENB) sent from the main body of the printing apparatus 1 to a drive circuit 110.

The drive circuit 110 is configured by a data loading circuit 112, a logic circuit 113, and a drive element 114. In the logic circuit 113, logical ANDs are used for convenience and limitation is not made to these. A logical power supply 111 is a power supply for low-voltage (e.g., 3.3 V) driving circuits, and a ground wiring 104 serves as a reference voltage. Here, a configuration in which a ground wiring 123 and the ground wiring 104 are separated from each other is adopted. This is because there is a possibility that, when the ground wiring 123 and the ground wiring 104 are the same, the drive control signal may not be received correctly because the reference voltage will fluctuate substantially since a large pulsed current will flow to the heater 122.

Note, a clock signal CLK, a data signal DATA, and an enable signal ENB are supplied from the main body of the printing apparatus through dedicated signal lines 101a, 102a, and 103a connected to dedicated electrode pads P202, P203, and P204, respectively. The ground wiring 104 is connected to the main body of the printing apparatus via an electrode pad P207.

Figure 4:
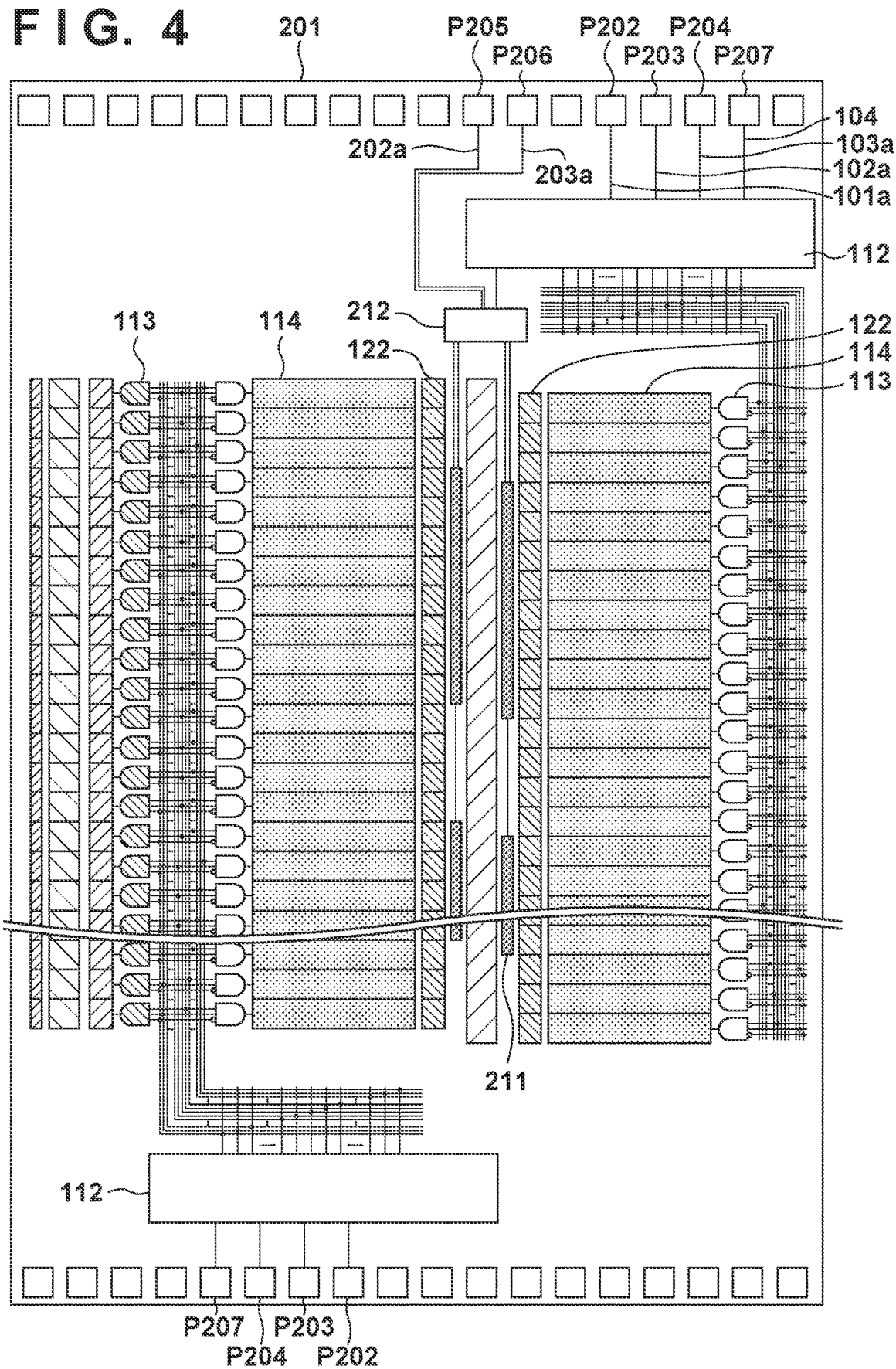
FIG. 4 is a view illustrating an outline of a layout configuration of an element substrate integrated within the printhead.

FIG. 4 is a view illustrating an outline of a layout configuration of an element substrate integrated within the printhead. In FIG. 4, the same components as those already described with reference to FIG. 3 are denoted by the same reference numerals, and description thereof is omitted.

As illustrated in FIG. 4, a temperature detection element 211 for measuring the temperature of an element substrate 201 is arranged in the vicinity of the heater 122. The temperature detection element 211 uses, for example, a diode characteristic of a transistor. An electric current supply line 203a supplies a constant current of about several 100 μA from the anode terminal of the diode toward the ground wiring 104. Temperature detection is performed by reading the difference between the voltage of the anode terminal and the voltage of the ground wiring 104 when a constant current is supplied. At this time, when the constant current supplied to the anode terminal flows into a voltage reading circuit (not shown), the current flowing through the diode itself decreases, the voltage between the anode terminal and the ground wiring drops, and an error arises in the detected temperature.

Therefore, a circuit having as high an impedance as possible is configured so that a current does not flow into the voltage reading circuit. In addition, since a voltage drop occurs due to the resistance of the actual wiring for supplying the current, a three-terminal measuring circuit is configured by using a temperature detection line 202a separately from the electric current supply line 203a so that the error of the detected temperature is minimized.

Since temperature unevenness arises in the element substrate 201 when the element substrate 201 is increased in size, a plurality of temperature detection elements 211 are generally arranged for the purpose of detecting such unevenness. At this time, when the electric current supply line 203a and the temperature detection line 202a are plurally arranged, it is difficult to implement a plurality of wirings within the element substrate 201. Therefore, in this embodiment, configuration is taken such that an analog switch 212 is used to selectively switch connection to a plurality of temperature detection elements to read from them. By this, it is possible to prevent an increase of the number of wirings. Switching of the analog switch 212 is performed by a drive control signal via the data loading circuit 112.

Note, the electric current supply line 203a and the temperature detection line 202a are connected to the electrode pads P206 (third pad) and the P205 (fourth pad), respectively, and are connected to the main body of the printing apparatus 1, which is an external apparatus from the perspective of the printhead, via these electrode pads.

<Description of a Configuration of Temperature Detection of the Printhead (FIGS. 5 to 7)>

Figure 5:
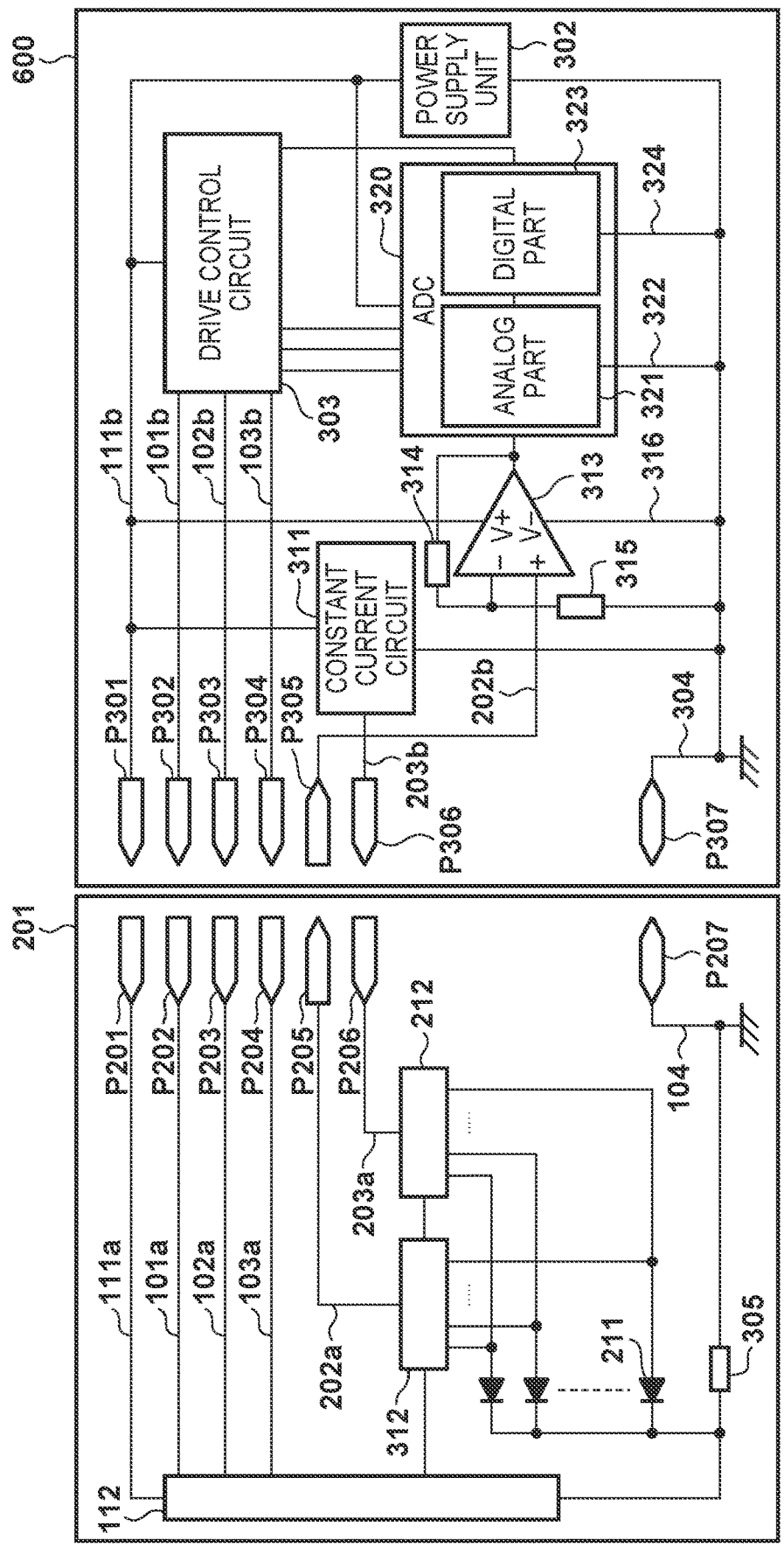
FIG. 5 is a schematic diagram illustrating a relationship of a connection between an element substrate of the printhead and a controller of the printing apparatus according a conventional configuration.

FIG. 5 is a schematic diagram illustrating a relationship of a connection between an element substrate of the printhead and a controller of the printing apparatus according a conventional configuration. Note that in FIG. 5, a circuit symbol of a diode is used as the temperature detection element 211 for convenience. The element substrate 201 and the controller 600 are electrically connected to each other by the electrode pads P201 and P301, the electrode pads P202 and P302, and similarly below, the electrode pads P203 to P207, and the electrode pads P303 to P307 (sixth pad) being connected, respectively. The electrode pads P302 to P304 are connected to a drive control circuit 303 by the signal lines 101b, 102b, and 103b, respectively.

Furthermore, in FIG. 5, the same components as those already described with reference to FIGS. 3 to 4 are denoted by the same reference numerals, and description thereof is omitted.

A constant current circuit 311 equipped in the controller 600 supplies a constant current to the temperature detection element 211 to drive the temperature detection element 211. In the controller 600, the constant current circuit 311 and electrode pad (seventh pad) P306 are connected by an electric current supply line 203b.

When a constant current is supplied to the temperature detection element 211, a difference in voltage inversely proportional to the temperature arises between the anode terminal and the cathode terminal of the temperature detection element 211. The cathode terminal of the temperature detection element 211 is connected to the ground wiring 104, and the constant current that flows through the temperature detection element 211 is fed back to the controller 600 through the ground wiring 104. In a case where a plurality of the temperature detection element 211 are provided on the element substrate 201, an analog switch 312 is provided to selectively switch and connect the temperature detection elements 211. The analog switch 212 and the analog switch 312 perform switching concurrently. In the controller 600, the electrode pad (eighth pad) P305 and an amplifier (operational amplifier) 313 are connected by a temperature detection line 202b, and the voltage signal of the temperature detection element 211 is inputted to the amplifier 313.

In the amplifier 313, the V+ side is connected to a wiring 111b, and the V− side is connected to a ground wiring (fourth wiring) 304 by a wiring 316.

The voltage (forward voltage) between the anode terminal and the cathode terminal of the temperature detection element 211 is, for example, about 650 mV when the temperature is 25° C., and the voltage drops 2 mV per 1° C., for example, in accordance with a rise in temperature. A logical voltage supplied from a power supply unit 302 to the drive control circuit 303, the constant current circuit 311, the amplifier 313, and an A/D converter (ADC) 320 via the wiring 111b is, for example, 3.3 V. The A/D converter (ADC) 320 includes an analog part 321 for inputting an analog signal and a digital part 323 for outputting a digital signal, and performs analog-to-digital conversion on the inputted signal. Respective parts of the A/D converter 320 are connected to the ground wiring 304 via wirings 322 and 324.

When the printhead 3 is mounted on the printing apparatus 1, the electrode pads P301 and P201 are connected and the logical voltage from the power supply unit 302 is supplied to the drive circuit 110 of the element substrate 201 via the wiring 111b and a wiring 111a.

Here, if the resolution of the A/D converter 320 is within a range of the logical voltage of the A/D converter 320, the smallest unit of detectable voltage is about 3.2 mV in a case where the A/D converter 320 has, for example, a 10-bit resolution (1024 steps). This results in about 1.6° C. when converted to temperature, and a fine temperature change of 1° C. or less cannot be detected, and the control becomes coarse. Accordingly, a method of amplifying a voltage detected by the temperature detection element 211 by the amplifier 313 is considered. Amplification gain is set by resistances 314 and 315.

For example, when the gain is set to 5, the voltage to be changed is 10 mV/° C., and the smallest unit of detectable voltage is about 0.32 mV. When this is converted to a temperature, it is about 0.16° C. and finer control is possible. For example, in a case where anode terminal voltages of 0.4 V or less are not handled, an offset circuit (not shown) may be combined with the amplifier. As a result, since the gain can be further increased, the smallest unit of detectable voltage can be made even finer. In this manner, the value obtained by converting the temperature detection signal into a digital value is inputted to the drive control circuit 303, and is used when the drive control signal is generated.

Here, since the space in which the ground wiring 104 of the element substrate 201 is wired is limited, the wiring width must be made to be thin even though it is ground wiring, and there is a wiring resistance 305 across the entire wiring. During the operation of the drive circuit 110, the voltage of the ground wiring 104 fluctuates due to the current flowing through the ground wiring 104 and the wiring resistance 305. That is, the reference voltage in the element substrate 201 fluctuates.

On the other hand, since the ground wiring 304 in the controller 600 is usually designed to have an extremely low impedance, the voltage of the ground wiring 304 hardly fluctuates. Although the voltage of the electrode pad P207 becomes the same as the voltage of the ground wiring 304 of the controller 600, because the wiring resistance 305 becomes larger as the distance from the electrode pad P207 to a certain position on the ground wiring 304 becomes longer, the voltage of the controller 600 becomes higher than that of the electrode pad P207.

As suggested by FIG. 4, it is often the case that the temperature detection element 211 is arranged at a position away from the electrode pad provided at the end portion of the element substrate 201, and a temperature detection voltage of the temperature detection element 211 is a voltage based on a potential higher than that of the electrode pad (first pad) P207. When this temperature detection voltage is obtained by the controller 600, a voltage obtained by adding the voltage rise due to the wiring resistance 305 to the voltage originally output by the temperature detection element 211 is obtained, which becomes an error of the detection temperature.

Figure 6:
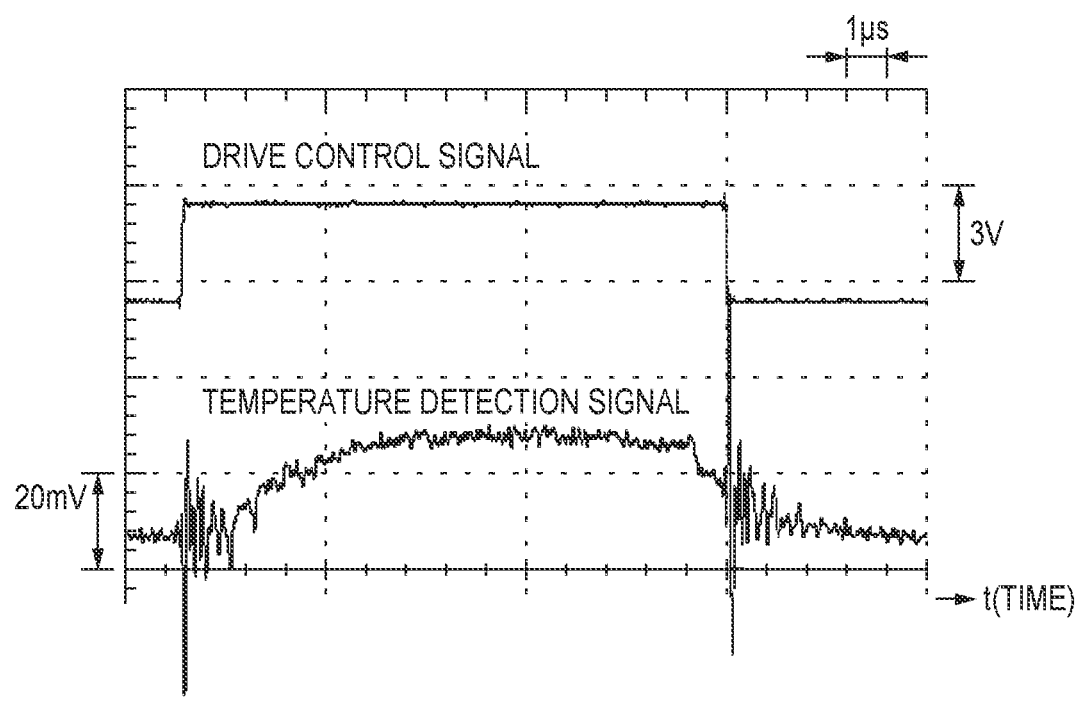
FIG. 6 is a view illustrating a relationship between a temperature detection signal and a drive control signal which are affected by a voltage fluctuation of a ground wiring.

FIG. 6 is a view illustrating a relationship between a temperature detection signal and a drive control signal which are affected by a voltage fluctuation of a ground wiring.

As illustrated in FIG. 6, it is understood that when the drive control signal is effective, the temperature detection signal fluctuates by about 20 mV under the influence of the voltage fluctuation of the ground wiring 104. This corresponds to about 10° C. when converted to temperature, which greatly affects the temperature control. If the error is constant at 10° C., for example, the error can be corrected by a calculation in the drive control circuit 303. However, the amount of current flowing through the ground wiring 104 depends on the driving current of the drive circuit 110 which is governed by a driving condition such as a number of signal bits of the drive control signal and the transmission frequency at the time of transmitting data. Therefore, in order to perform a correction by calculation, a correction value corresponding to the driving condition needs to be written in advance in a non-volatile memory or the like, or the correction value needs to be calculated in real time from the driving condition during driving. It is very difficult to perform such control accurately.

Figure 7:
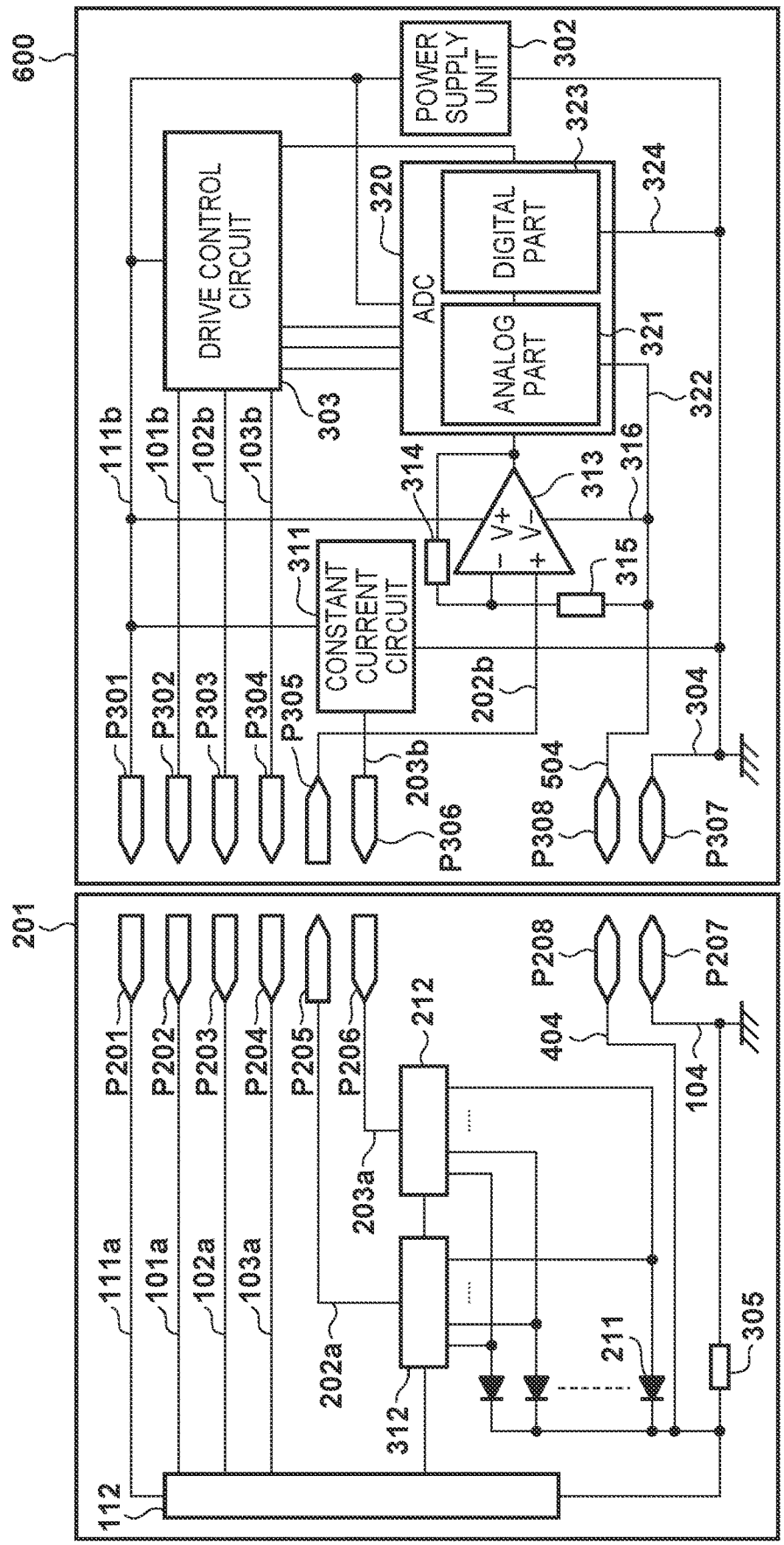
FIG. 7 is a schematic diagram illustrating circuits of an element substrate and a controller of the printhead according to this embodiment.

FIG. 7 is a schematic diagram illustrating circuits of the element substrate and the controller of the printhead according to this embodiment. In FIG. 7, the same components as those already described with reference to FIGS. 3 to 5 are denoted by the same reference numerals, and description thereof is omitted.

As described above, when a current flows through the ground wiring (first wiring) 104, the voltage of the ground wiring 104 fluctuates. Since the temperature detection element 211 outputs a signal voltage with reference to the voltage of the ground wiring 104 which fluctuates, the temperature detection signal of the temperature detection element 211 also fluctuates in conjunction with the fluctuation of the ground wiring 104. At this time, when the amplifier 313 uses the ground wiring 304 as a reference, since the ground wiring 304 has a low wiring impedance and does not fluctuate in voltage as described above, the fluctuation of the temperature detection signal due to the fluctuation of the ground wiring 104 may mistakenly be recognized as a correct value of the temperature detection signal. The signal that is amplified and output from the amplifier 313 is also output in a fluctuated state, and is converted into a digital signal in a fluctuated state by the A/D converter 320. When the digital signal is inputted to the drive control circuit 303, the drive control circuit 303 ends up recognizes the temperature as actually fluctuating, and so drive control dependent on the temperature does not function correctly.

Therefore, in this embodiment, the element substrate 201 is provided with a ground wiring (second wiring) 404 and an electrode pad (second pad) P208 connected to the ground wiring 404. Meanwhile, the controller 600 is provided with a ground wiring (third wiring) 504 and an electrode pad (fifth pad) P308 connected to the ground wiring 504. The ground wiring 404 is wired from the vicinity of the cathode terminal of the temperature detection element 211. The wiring 316 on the V− side of the amplifier 313, the ground connection side of the resistance 315 for setting the gain of the amplifier 313, and the wiring 322 of the analog part 321 of the A/D converter 320 are connected to the ground wiring 504. Here, in the controller 600, the ground wiring 304, and the ground wiring 504 are not connected to each other.

At this time, a part of the consumption current of the amplifier 313 and the A/D converter 320 flows through the ground wiring 504 and the ground wiring 404 to the ground wiring 304 through the ground wiring 104. However, since the current consumption of these circuits can be extremely small, the wiring resistance of the ground wiring 404 and the ground wiring 504 can be mostly ignored.

Therefore, the voltage fluctuation of the ground wiring 104 can be transferred to the amplifier 313 or the like via the ground wiring 404 and the ground wiring 504. By the wiring 316 serving as the reference ground of the amplifier 313 being connected to the ground wiring 504 linked to the voltage fluctuation of the ground wiring 104 and the ground wiring 404, the reference voltage of the amplifier 313 also fluctuates in conjunction therewith, and the fluctuation of the temperature detection signal which is transferred through the temperature detection line 202a can be ignored. As a result, correct temperature detection signals can be obtained without the influence of the voltage fluctuation of the ground wiring 104.

The temperature detection signal amplified by the amplifier 313 appears stable when viewed with respect to the ground wiring 504, but remains affected by the ground wiring 104 when viewed with respect to the ground wiring 304. However, by connecting the wiring 322 serving as the reference ground of the analog part 321 of the A/D converter 320 to the ground wiring 504, the temperature detection signal can be converted into a digital value while removing the fluctuation of the temperature detection signal amplified by the amplifier 313.

Here, since the reference ground of the digital part 323 of the A/D converter 320 is connected to the ground wiring 304 by the wiring 324, the signal voltage of the digital signal transmitted to the drive control circuit 303 can be set to the stable ground wiring 304 as a reference. As a result, error-free signal transfer can be performed between the A/D converter 320 and the drive control circuit 303. In addition, it is possible to prevent digital noise from the digital part 323 or the like from being superimposed on the ground of the main body of the printing apparatus 1.

Therefore, according to the embodiment described above, as seen from a comparison between FIG. 5 and FIG. 7, it is possible to effectively remove the fluctuation of the temperature detection signal output from the temperature detection element without greatly changing the circuit configuration from the conventional example.

Note, in a case where a plurality of temperature detection elements are arranged at various positions on the element substrate, the wirings on the cathode sides of the temperature detection elements may be selectively switched and connected by an analog switch in the same manner as the wirings on the anode side. In this case, the voltage fluctuation of the ground wiring can be removed for each location of the plurality of temperature detection elements, which is more effective.

Furthermore, although the amplifier of the embodiment described above is a non-inverting amplifier, an inverting amplifier, a differential amplifier, an instrumentation amplifier, or the like may be used by a circuit in a subsequent stage. In particular, since the input impedance of the non-inverting amplifier and the inverting amplifier can be set to a high impedance, they are suitable as an amplifier.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-206874, filed Nov. 1, 2018, which is hereby incorporated by reference herein in its entirety.

What is claimed is:

1. An element substrate provided with a plurality of electrothermal transducers, a plurality of drive elements for driving each of the plurality of electrothermal transducers, a logic circuit for supplying a signal to the plurality of drive elements, and a temperature detection element, and connected to an external apparatus having a circuit for detecting a temperature based on a temperature detection signal outputted from the temperature detection element, comprising:
   a first wiring grounded, connected to an end portion of the temperature detection element, and serving as a reference voltage of the temperature detection signal outputted from the temperature detection element;
   a second wiring connected to the first wiring in the vicinity of the temperature detection element;
   a first pad connected to the first wiring; and
   a second pad connected to the second wiring, wherein
   in a case where the element substrate is connected to the external apparatus, a wiring serving as a reference voltage for a side on which the temperature detection signal of the circuit that the external apparatus has is inputted is connected to the second pad via the first pad connected to a ground serving as a reference voltage of the external apparatus.

2. The element substrate according to claim 1, wherein the temperature detection element is a diode,
   and further comprising:
   a third pad for inputting a constant current to an anode side of the diode; and
   a fourth pad for outputting a temperature detection signal obtained from the anode side of the diode to the external apparatus.

3. The element substrate according to claim 2, wherein the first wiring is connected to a cathode side of the diode, and
   the second wiring is connected in the vicinity of the cathode side of the diode.

4. The element substrate according to claim 2, wherein the first pad, the second pad, the third pad, and the fourth pad are provided at an end portion of the element substrate, and
   the diode is arranged at a position away from the end portion of the element substrate.

5. The element substrate according to claim 1, wherein a plurality of the temperature detection element are provided,
   further comprising a switch configured to select a temperature detection element for performing temperature detection from the plurality of the temperature detection elements, wherein
   the switch selects the temperature detection element based on a control signal inputted from the external apparatus.

6. The element substrate according to claim 1, wherein the impedance of the first wiring is high.

7. A printhead comprising:
an element substrate provided with a plurality of electrothermal transducers, a plurality of drive elements for driving each of the plurality of the electrothermal transducers, a logic circuit for supplying a signal to the plurality of the drive elements, and a temperature detection element, and connected to an external apparatus having a circuit for detecting a temperature based on a temperature detection signal outputted from the temperature detection element; and
a plurality of nozzles corresponding to the plurality of the electrothermal transducers, wherein
the element substrate includes:
a first wiring grounded, connected to an end portion of the temperature detection element, and serving as a reference voltage of a temperature detection signal outputted from the temperature detection element;
a second wiring connected to the first wiring in the vicinity of the temperature detection element;
a first pad connected to the first wiring; and
a second pad connected to the second wiring, wherein
in a case where the element substrate is connected to the external apparatus, a wiring, serving as a reference voltage for a side on which the temperature detection signal of the circuit that the external apparatus has is inputted is connected to the second pad via the first pad connected to a ground serving as a reference voltage of the external apparatus, and wherein
ink is bubbled by thermal energy generated by driving the plurality of electrothermal transducers and printing is performed by the ink being discharged from the plurality of nozzles.

8. A printing apparatus for performing printing by discharging ink onto a print medium by using a printhead, wherein the printhead comprises:
an element substrate provided with a plurality of electrothermal transducers, a plurality of drive elements for driving each of the plurality of the electrothermal transducers, a logic circuit for supplying a signal to the plurality of the drive elements, and a temperature detection element, and connected to an external apparatus having a circuit for detecting a temperature based on a temperature detection signal outputted from the temperature detection element; and
a plurality of nozzles corresponding to the plurality of the electrothermal transducers, wherein
the element substrate includes:
a first wiring grounded, connected to an end portion of the temperature detection element, and serving as a reference voltage of a temperature detection signal outputted from the temperature detection element;
a second wiring connected to the first wiring in the vicinity of the temperature detection element;
a first pad connected to the first wiring; and
a second pad connected to the second wiring, wherein
in a case where the element substrate is connected to the external apparatus, a wiring, serving as a reference voltage for a side on which the temperature detection signal of the circuit that the external apparatus has is inputted is connected to the second pad via the first pad connected to a ground serving as a reference voltage of the external apparatus, and wherein
ink is bubbled by thermal energy generated by driving the plurality of electrothermal transducers and printing is performed by the ink being discharged from the plurality of nozzles,
the printing apparatus comprising:
an amplifier configured to amplify a temperature detection signal outputted from the temperature detection element;
an A/D converter configured to perform analog-to-digital conversion of the temperature detection signal amplified by the amplifier;
a third wiring serving as a reference voltage of an analog part of the amplifier and the A/D converter;
a fourth wiring that is grounded;
a fifth pad connected to the third wiring; and
a sixth pad connected to the fourth wiring, wherein
in a case where the printhead is connected, the fifth pad is connected to the second pad, the sixth pad is connected to the first pad, and a circuit is formed from the third wiring through the fifth pad and the second pad, through the second wiring and the first wiring, through the first pad and the sixth pad, and to the fourth wiring.

9. The apparatus according to claim 8, further comprising:
a constant current circuit configured to generate a constant current to be supplied to the temperature detection element on the basis of a current supplied from a power supply unit,
a seventh pad configured to output a constant current generated by the constant current circuit, and
an eighth pad configured to input the temperature detection signal.

10. The apparatus according to claim 8, wherein the impedance of the fourth wiring is low.

* * * * *